United States Patent
Masuda et al.

(10) Patent No.: US 11,203,793 B2
(45) Date of Patent: *Dec. 21, 2021

(54) STEEL PIPE FOR FUEL INJECTION PIPE AND METHOD FOR PRODUCING THE SAME

(71) Applicants: USUI CO., LTD., Shizuoka (JP); NIPPON STEEL & SUMITOMO METAL CORPORATION, Tokyo (JP)

(72) Inventors: Tatsuya Masuda, Shizuoka (JP); Tsugumi Yamazaki, Shizuoka (JP); Hiroaki Kondo, Shizuoka (JP); Taizo Makino, Tokyo (JP); Masahiro Yamazaki, Tokyo (JP); Katsunori Nagao, Tokyo (JP)

(73) Assignees: USUI CO., LTD., Shizuoka (JP); NIPPON STEEL CORPORATION, Tokyo (JP)

(\*) Notice: Subject to any disclaimer, the term of this patent is extended or adjusted under 35 U.S.C. 154(b) by 846 days.

This patent is subject to a terminal disclaimer.

(21) Appl. No.: 15/736,002

(22) PCT Filed: May 26, 2016

(86) PCT No.: PCT/JP2016/065572
§ 371 (c)(1),
(2) Date: Dec. 13, 2017

(87) PCT Pub. No.: WO2016/203924
PCT Pub. Date: Dec. 22, 2016

(65) Prior Publication Data
US 2018/0171426 A1    Jun. 21, 2018

(30) Foreign Application Priority Data
Jun. 17, 2015  (JP) .............................. JP2015-122321

(51) Int. Cl.
*C21D 9/08* (2006.01)
*C21D 7/04* (2006.01)
(Continued)

(52) U.S. Cl.
CPC ............... *C21D 9/085* (2013.01); *C21D 1/28* (2013.01); *C21D 7/04* (2013.01); *C21D 8/105* (2013.01);
(Continued)

(58) Field of Classification Search
None
See application file for complete search history.

(56) References Cited

U.S. PATENT DOCUMENTS 4,417,459 A * 11/1983 Tomita ...................... B23P 9/00
29/446
2005/0005913 A1   1/2005 Usui et al.
(Continued)

FOREIGN PATENT DOCUMENTS

CN    103789880    5/2014
CN    104024453    9/2014
(Continued)

OTHER PUBLICATIONS

E. Nakayama et al., "Prediction of Fatigue . . . by Small Specimen", J. Soc, Mat. Sci., Japan, vol. 53, No. 10, pp. 1136-1142, Oct. 2004.
(Continued)

*Primary Examiner* — Nicholas A Wang
*Assistant Examiner* — Anthony M Liang
(74) *Attorney, Agent, or Firm* — Clark & Brody LP

(57) ABSTRACT

A steel pipe for fuel injection pipe has a tensile strength of 500 to 900 MPa and a yield ratio of 0.50 to 0.85, and has a critical internal pressure (IP) satisfying [IP≥0.41×TS×α] ($\alpha=[(D/d)^2-1]/[0.776\times(D/d)^2]$), where TS: tensile strength (MPa) of the steel pipe, D: steel pipe outer diameter (mm),
(Continued)

and d: steel pipe inner diameter (mm)), wherein a circumferential-direction residual stress on an inner surface of the pipe is −20 MPa or lower after the steel pipe is split in half in a pipe axis direction.

20 Claims, 3 Drawing Sheets

(51) Int. Cl.
    *C21D 8/10*     (2006.01)
    *C21D 1/28*     (2006.01)
    *C22C 38/50*     (2006.01)
    *C22C 38/48*     (2006.01)
    *C22C 38/46*     (2006.01)
    *C22C 38/44*     (2006.01)
    *C22C 38/42*     (2006.01)
    *C22C 38/06*     (2006.01)
    *C22C 38/04*     (2006.01)
    *C22C 38/02*     (2006.01)
    *C22C 38/00*     (2006.01)
    *F02M 55/02*     (2006.01)
    *F16L 9/02*     (2006.01)
    *F02M 55/00*     (2006.01)
    *C22C 38/58*     (2006.01)

(52) U.S. Cl.
    CPC ............ *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F02M 55/00* (2013.01); *F02M 55/02* (2013.01); *F16L 9/02* (2013.01); *C21D 2211/002* (2013.01); *C21D 2211/005* (2013.01); *C21D 2211/009* (2013.01)

(56) References Cited

U.S. PATENT DOCUMENTS

| | | |
|---|---|---|
| 2005/0127665 A1 | 6/2005 | Usui et al. |
| 2008/0110533 A1 | 5/2008 | Sakamoto |
| 2009/0078341 A1 | 3/2009 | Asada et al. |
| 2009/0151701 A1 | 6/2009 | Kato et al. |
| 2010/0055490 A1 | 3/2010 | Sugihashi et al. |
| 2011/0209803 A1 | 9/2011 | Sugimoto et al. |

FOREIGN PATENT DOCUMENTS

| | | | | |
|---|---|---|---|---|
| EP | 2 799 567 | | 11/2014 | |
| JP | 62-297414 | | 12/1987 | |
| JP | 09-057329 | | 3/1997 | |
| JP | 2005-201254 | | 7/2005 | |
| JP | 2007-031765 | | 2/2007 | |
| JP | 2007031765 | A * | 2/2007 | ............ C21D 6/005 |
| JP | 2007-231353 | | 9/2007 | |
| JP | 2009-144668 | | 7/2009 | |
| JP | 4405101 | | 1/2010 | |
| JP | 2010-106353 | | 5/2010 | |
| JP | 4640992 | | 3/2011 | |
| JP | 5505338 | | 5/2014 | |
| JP | 2014-101755 | | 6/2014 | |
| WO | 2007/119734 | | 10/2007 | |
| WO | 2009/008281 | | 1/2009 | |
| WO | 2015/129617 | | 9/2015 | |

OTHER PUBLICATIONS

The Society of Material Science, Japan, "Standard method for X-ray stress measurement", Mar. 2002, Steel Edition.

Y. Murakami, "Metal Fatigue—The Effect of Minute Defects and Inclusions", First Edition, p. 18, Yokendo, 1993.

* cited by examiner

STEEL PIPE FOR FUEL INJECTION PIPE AND METHOD FOR PRODUCING THE SAME

TECHNICAL FIELD

The present invention relates to a steel pipe for fuel injection pipe and a method for producing the same.

BACKGROUND ART

As countermeasures against energy exhaustion in future, the movement for promoting energy saving, the movement for recycling resources, and the development of technologies to achieve these goals have gained momentum. In recent years, in particular, there have been strong demands for the reduction of $CO_2$ emissions with fuel combustion to prevent the global warming, as worldwide efforts.

Internal combustion engines with low $CO_2$ emissions include diesel engines used in automobiles or the like. However, while emitting less $CO_2$, diesel engines suffer from a problem of generating black smoke. Black smoke is generated for lack of oxygen with respect to injected fuel. Specifically, some of the fuel is thermally decomposed, which causes dehydrogenation to generate a precursor of black smoke, and this precursor is thermally decomposed again and agglomerated and combined to form black smoke. The black smoke generated in such a manner brings about air pollution, and there is a concern of an adverse effect thereof on human bodies.

The amount of generated black smoke described above can be reduced by increasing the injection pressure of fuel to combustion chambers of a diesel engine. However, for this purpose, a steel pipe used for fuel injection is required to have a high fatigue strength. For such a fuel injection pipe or a steel pipe for fuel injection pipe, the following techniques have been disclosed.

Patent Document 1 discloses a method for producing a steel pipe used for fuel injection in a diesel engine, in which the inner surface of a seamless steel pipe starting material subjected to hot rolling is ground and abraded by shot blasting, and the starting material is thereafter subjected to cold drawing. Patent Document 1 describes that, by employing this production method, it is possible to make the depths of flaws on the steel pipe inner surface (e.g., unevenness, fracture, fine crack, or the like) 0.10 mm or less, achieving a high strength of a steel pipe used for fuel injection.

Patent Document 2 discloses a steel pipe for fuel injection pipe having a tensile strength of 900 $N/mm^2$ or higher in which the maximum diameter of nonmetallic inclusions existing at up to a depth of 20 μm from the inner surface of the steel pipe is 20 μm or less.

The invention of Patent Document 2 achieves a tensile strength of 900 MPa or higher by producing a material steel pipe using steel materials from which A type, B type, and C type coarse inclusions are removed through reducing S (sulfur), devising a casting method, reducing Ca (calcium), and the like, adjusting the diameter of the material steel pipe into an intended diameter by cold rolling, and thereafter performing quench and temper. In examples, critical internal pressures of 260 to 285 MPa are achieved.

Patent Document 3 discloses a steel pipe for fuel injection pipe in which the maximum diameter of nonmetallic inclusions existing at up to a depth of 20 μm from the inner surface of the steel pipe is 20 μm or less, the steel pipe having a tensile strength of 500 MPa or higher.

LIST OF PRIOR ART DOCUMENTS

Patent Document

Patent Document 1: JP9-57329A
Patent Document 2: WO 2009/008281
Patent Document 3: WO 2007/119734

Non Patent Document

Non Patent Document 1: Eisuke Nakayama, Mitsuo Miyahara, Kazuo Okamura, Hiroki Fujimoto, and Kiyoyuki Fukui, "Prediction of Fatigue Strength of Spot-Welded Joints Based on Local Material Strength Properties Measured by Small Specimen", J. Soc, Mat. Sci., Japan, Vol. 53, No. 10, pp. 1136-1142, October 2004
Non Patent Document 2: The society of Material Science, Japan, "Standard method for X-ray stress measurement" (2002 Version)—Steel Edition, March 2002
Non Patent Document 3: Y. Murakami, "Kinzoku Hirou— Bishou Kekkan to Kaizaibutsu no Eikyou (in Japanese)" ("Metal Fatigue—The Effect of Minute Defects and Inclusions"), First Edition (1993), Yokendo, p. 18

DISCLOSURE OF THE INVENTION

Problems to be Solved by the Invention

A steel pipe used for fuel injection produced by the method disclosed in Patent Document 1 has a high strength but cannot offer a fatigue life appropriate to the strength of the steel pipe material thereof. As a matter of course, a higher strength of a steel pipe material allows a higher pressure to be applied to the inside of the steel pipe. However, in the case of applying a pressure to the inside of a steel pipe, an internal pressure to be a limit within which no fracture due to fatigue occurs on a steel pipe inner surface (hereafter, referred to as a critical internal pressure) does not depend only on the strength of a steel pipe material. In other words, even if the strength of the steel pipe material is increased, a critical internal pressure more than expected cannot be obtained. Considering the reliability of an end product and the like, the longer the fatigue life is, the more preferable it is, but the lower the critical internal pressure is, the shorter the fatigue life becomes because the steel pipe is prone to be fatigued with use under high internal pressures.

The steel pipes for fuel injection pipe disclosed in Patent Documents 2 and 3 are characterized by long fatigue lives and high reliabilities. However, the steel pipe disclosed in Patent Document 2 has a critical internal pressure of 260 to 285 MPa but needs a tensile strength of 900 MPa or higher, as an indispensable requirement, to obtain the high critical internal pressure. Therefore, it is in general necessary to perform quenching and tempering in the producing process of the steel pipe, resulting not only in a decrease in workability of the steel pipe but also in an increase in producing costs, which remains a problem also in terms of economic efficiency.

In addition, the technique disclosed in Patent Document 3 does not necessarily involve quenching and tempering and thus has an advantage of keeping producing costs low. However, the critical internal pressure of the steel pipe is 255 MPa or lower, and the technique cannot be said to succeed in obtaining a high critical internal pressure commensurate with the tensile strength of the steel pipe. In particular, in the automotive industry, recent trends demand the balance of the reduction of costs and the increase in internal pressure, which requires a technique that increases the critical internal pressure without a special treatment to provide high a tensile strength.

An objective of the present invention is to provide a steel pipe for fuel injection pipe of high reliability having such high critical internal pressure properties that its critical internal pressure is 0.41×TS×α or higher for the tensile strength (TS) of the steel pipe, and to provide a method for producing the steel pipe for fuel injection pipe. Note that α is, as will be described later, a coefficient for correcting changes in the relation between an internal pressure and stress occurring on a pipe inner surface according to the ratio between outer and inner diameters of the pipe, and α takes on 0.97 to 1.02, that is, approximately 1 when D/d, a ratio of an outer diameter D to an inner diameter d of the pipe, falls within the range of 2 to 2.2.

Means for Solving the Problems

The present invention is made to solve the above problems, and has a gist of the following steel pipe for fuel injection pipe and method for producing the steel pipe for fuel injection pipe.

(1) A steel pipe for fuel injection pipe, the steel pipe having:

a tensile strength of 500 to 900 MPa and a yield ratio of 0.50 to 0.85; and a critical internal pressure satisfying a following formula (i), wherein a circumferential-direction residual stress on an inner surface of the steel pipe is −20 MPa or lower after the steel pipe is split in half in a pipe axis direction:

$$IP \geq 0.41 \times TS \times \alpha \quad \text{(i)}$$

$$\alpha = [(D/d)^2 - 1]/[0.776 \times (D/d)^2] \quad \text{(ii)}$$

where, in the above formula (i), IP denotes the critical internal pressure (MPa) of the steel pipe, TS denotes the tensile strength (MPa) of the steel pipe, and α is a value expressed by the above formula (ii), and where, in the above formula (ii), D denotes an outer diameter (mm) of the steel pipe, and d denotes an inner diameter (mm) of the steel pipe.

(2) The steel pipe for fuel injection pipe according to the above (1), wherein the steel pipe has a chemical composition consisting, by mass percent, of C: 0.12 to 0.27%,
Si: 0.05 to 0.50%,
Mn: 0.3 to 2.0%,
Al: 0.005 to 0.060%,
N: 0.0020 to 0.0080%,
Ti: 0.005 to 0.040%,
Nb: 0.015 to 0.045%,
Cr: 0 to 1.0%,
Mo: 0 to 1.0%,
Cu: 0 to 0.5%,
Ni: 0 to 0.5%,
V: 0 to 0.15%,
B: 0 to 0.005%, and
the balance: Fe and impurities, and
contents of Ca, P, S, and O in the impurities being
Ca: 0.001% or less,
P: 0.02% or less,
S: 0.01% or less, and
O: 0.0040% or less.

(3) The steel pipe for fuel injection pipe according to the above (2), wherein
the chemical composition contains, by mass percent,
Ti: 0.005 to 0.015%.

(4) The steel pipe for fuel injection pipe according to the above (2) or (3), wherein
the chemical composition contains, by mass percent,
one or more elements selected from
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%.

(5) The steel pipe for fuel injection pipe according to any one of the above (1) to (4), wherein
the outer diameter and the inner diameter of the steel pipe satisfy a following formula (iii):

$$D/d \geq 1.5 \quad \text{(iii)}$$

where, in the above formula (iii), D denotes the outer diameter (mm) of the steel pipe, and d denotes the inner diameter (mm) of the steel pipe.

(6) A method for producing a steel pipe for fuel injection pipe that has a critical internal pressure satisfying a following formula (i), the method comprising subjecting a steel pipe starting material having a tensile strength of 500 to 900 MPa and a yield ratio of 0.50 to 0.85 to auto-frettage treatment at an auto-frettage treatment internal pressure that is 450 MPa or lower and satisfies a following formula (iv):

$$IP \geq 0.41 \times TS \times \alpha \quad \text{(i)}$$

$$\alpha = [(D/d)^2 - 1]/[0.776 \times (D/d)^2] \quad \text{(ii)}$$

$$P_{AF} < 0.44 \times TS \times (1 + YR) \quad \text{(iv)}$$

where, in the above formula (i), IP denotes a critical internal pressure (MPa) of the steel pipe, TS denotes the tensile strength (MPa) of the steel pipe starting material, and α is a value expressed by the above formula (ii), and where, in the above formula (ii), D denotes an outer diameter (mm) of the steel pipe, and d denotes an inner diameter (mm) of the steel pipe, and where, in the above formula (iv), $P_{AF}$ denotes an auto-frettage treatment internal pressure (MPa), TS denotes the tensile strength (MPa) of the steel pipe starting material, and YR denotes the yield ratio of the steel pipe starting material.

(7) The method for producing the steel pipe for fuel injection pipe according to the above (6), wherein
the steel pipe has a chemical composition consisting, by mass percent, of
C: 0.12 to 0.27%,
Si: 0.05 to 0.50%,
Mn: 0.3 to 2.0%,
Al: 0.005 to 0.060%,
N: 0.0020 to 0.0080%,
Ti: 0.005 to 0.040%,
Nb: 0.015 to 0.045%,
Cr: 0 to 1.0%,
Mo: 0 to 1.0%,
Cu: 0 to 0.5%,
Ni: 0 to 0.5%,
V: 0 to 0.15%,
B: 0 to 0.005%, and the balance: Fe and impurities,
contents of Ca, P, S, and O in the impurities being
Ca: 0.001% or less,
P: 0.02% or less,
S: 0.01% or less, and
O: 0.0040% or less.

(8) The method for producing the steel pipe for fuel injection pipe according to the above (7), wherein
the chemical composition contains, by mass percent,
Ti: 0.005 to 0.015%.

(9) The method for producing the steel pipe for fuel injection pipe according to the above (7) or (8), wherein
the chemical composition contains, by mass percent, one or more elements selected from
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%.

(10) The method for producing the steel pipe for fuel injection pipe according to any one of the above (6) to (9), wherein
the outer diameter and the inner diameter of the steel pipe satisfy a following formula (iii), $$D/d \geq 1.5 \qquad \text{(iii)}$$

where, in the above formula (iii), D denotes the outer diameter (mm) of the steel pipe, and d denotes the inner diameter (mm) of the steel pipe.

Advantageous Effects of the Invention

According to the present invention, it is possible to obtain a steel pipe for fuel injection pipe that exerts a high advantageous effect of improving critical internal pressure even with a relatively low auto-frettage treatment pressure and is excellent in workability and internal pressure fatigue resistance, at low cost.

MODE FOR CARRYING OUT THE INVENTION

Figure 1A:
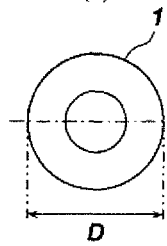
FIG. 1(a) and FIG. 1(b) are respectively a left side view and a front view of a steel pipe sample that is used for measuring a circumferential-direction residual stress on an inner surface of a pipe.

The present inventors conducted studies about methods for obtaining a steel pipe having a high critical internal pressure at low cost, and consequently obtained the following findings.

(a) By performing auto-frettage treatment, it is possible to increase the critical internal pressure of a steel pipe without increasing the tensile strength of the steel pipe. The auto-frettage treatment is a treatment to generate a compressive residual stress by applying an excessive internal pressure so as to subject the vicinity of an inner surface to plastic deformation partially.

(b) Performing the auto-frettage treatment involves a problem of an increase in running costs because a high pressure necessary to increase the critical internal pressure imposes increased loads on an auto-frettage treatment device. Therefore, from the viewpoint of reducing the running costs of an auto-frettage treatment device, it is desirable to use a material that allows a high advantageous effect of improving critical internal pressure to be obtained even at a low auto-frettage treatment pressure.

(c) In the case of using a steel having a low yield ratio, as a material, the inner surface of the steel pipe is prone to yield even at a relatively low auto-frettage treatment pressure, which enables a high compressive residual stress to be provided, facilitating obtaining an advantageous effect of improving critical internal pressure through the auto-frettage treatment.

The present invention is made based on the above findings. Hereinafter, each requirement of the present invention will be described in detail.

1. Mechanical Property

The steel pipe for fuel injection pipe according to the present invention has a tensile strength of from 500 to 900 MPa, as well as a yield ratio of from 0.50 to 0.85.

If the steel pipe has a tensile strength lower than 500 MPa, it is difficult to obtain a critical internal pressure necessary to be used as a fuel injection pipe even when a compressive residual stress is provided to the inner surface of the steel pipe. On the other hand, if the steel pipe has a tensile strength higher than 900 MPa, there arises a problem of a decrease in workability. In addition, to obtain a tensile strength higher than 900 MPa, a process to increase the strength of the steel pipe, such as quenching, is needed in many cases, which then increase producing costs. When the steel pipe is quenched to have a structure of an extremely high martensite ratio, it is relatively difficult to control the yield ratio thereof to be 0.85 or lower. The tensile strength of the steel pipe is preferably 650 MPa or higher and preferably 800 MPa or lower.

The burst resistance performance of a steel pipe is substantially proportionate to the sum of the tensile strength and the yield strength of the steel pipe. For this reason, when the steel pipe has an extremely low yield ratio, in particular, less than 0.50, the burst resistance performance of the steel pipe cannot be secured. Meanwhile, to provide a compressive residual stress to the inner surface of the steel pipe so as to obtain an advantageous effect of improving a critical internal pressure, the steel pipe needs to have a yield ratio of 0.85 or lower. The yield ratio of the steel pipe is preferably 0.55 or higher and preferably 0.80 or lower.

In the present invention, the tensile strength and the yield strength of the steel pipe are determined by cutting out a straight pipe portion of the steel pipe, chucking areas extending from both end faces of the straight pipe portion by a certain length (hereinafter, referred to as "grip portions"), and conducting a tensile test with an extensometer attached to a parallel portion between the grip portions. The chucking is performed by pressing contact pads formed with a V groove or round groove shallower than the external diameter of the steel pipe against the grip portions by means of oil pressure or bolting, or using a wedge jig.

The length of the grip portions may be determined in consideration of a pressing pressure and a test load so that the steel pipe for the test does not to slip during the test. In addition, the length of the parallel portion may be secured to the extent that the extensometer can be attached, and chucks do not influence necking deformation occurring immediately before rupture. If the steel pipe has no straight pipe portion having a sufficient length, the tensile test may be conducted using small specimen having a thin dumbbell shape cut out from the steel pipe, as described in Non Patent Document 1.

In addition, the steel pipe for fuel injection pipe according to the present invention has a critical internal pressure that satisfies the following formula (i):

$$IP \geq 0.41 \times TS \times \alpha \quad (i)$$

$$\alpha = [(D/d)^2 - 1] / [0.776 \times (D/d)^2] \quad (ii)$$

In the above formula (i), IP denotes the critical internal pressure (MPa) of the steel pipe, TS denotes the tensile strength (MPa) of the steel pipe, and α is a value expressed by the above formula (ii). In addition, D in the above formula (ii) denotes the outer diameter (mm) of the steel pipe, and d denotes the inner diameter (mm) of the steel pipe. The value α is a coefficient for correcting for changes in the relation between an internal pressure and a stress occurring on the inner surface of the pipe according to the ratio between the outer diameter and the inner diameter of the pipe.

A critical internal pressure satisfying the above formula (i) enables securing safety from fatigue fracture even with a relatively low tensile strength. The term "critical internal pressure" in the present invention means the maximum internal pressure (MPa) within which no breakage (leak) occurs after $10^7$ cycles of repetitive internal pressure fluctuations that follow a sine wave over time in an internal pressure fatigue test with a minimum internal pressure set at 18 MPa. Specifically, the critical internal pressure is determined, on an S-N diagram of which the vertical axis represents maximum internal pressure, and the horizontal axis represents the number of cycles to breakage, in the form of the middle value between the minimum value of maximum internal pressures within which breakage occurs and the maximum value of the maximum internal pressures within which no breakage occurs even when the number of cycles reaches $10^7$ cycles.

Furthermore, the steel pipe for fuel injection pipe according to the present invention has a circumferential-direction residual stress of −20 MPa or lower on the inner surface of the steel pipe after the steel pipe is split in half in a pipe axis direction. As described above, by providing a large compressive residual stress to the inner surface of the steel pipe, it is possible to increase the critical internal pressure. The circumferential-direction residual stress preferably is −40 MPa or lower.

Figure 1B:
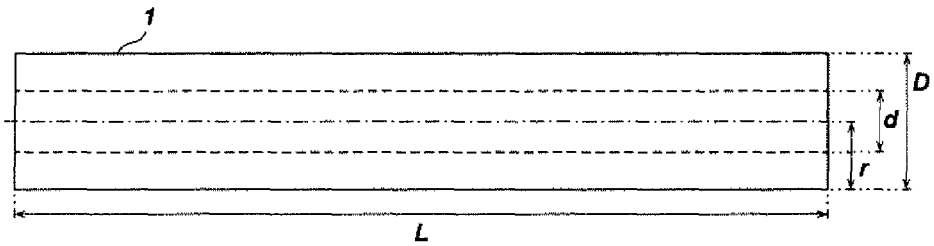
Figure 1C:
FIG. 1(c) and FIG. 1(d) are respectively a left side view and a front view of the sample that is split in half.
Figure 1D:
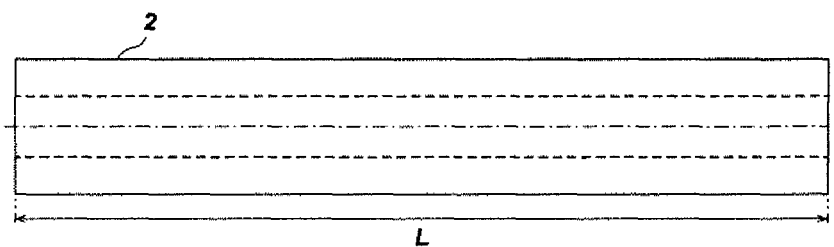

A method for measuring the circumferential-direction residual stress in the present invention will be described in detail with reference to FIG. 1. FIGS. 1(a) and 1(b) are respectively a left side view and a front view of a steel pipe sample 1, and FIGS. 1(c) and 1(d) are respectively a left side view and a front view of a sample 2 obtained by splitting the steel pipe sample 1 in half. First, the steel pipe sample 1 to be measured is cut out using a micro cutter or the like. A length L of the steel pipe sample 1 is preferably set at three times or more a steel pipe outer diameter D and can be set at, for example, about 30 mm.

Next, the steel pipe sample 1 is split in half in the pipe axis direction. When heat generation in the cutting becomes excessive, it influences on residual stress on the inner surface of the pipe. Therefore, it is necessary to employ a cutting method that generates heat as low as possible, and the cutting is preferably performed by the wire electrical discharge machining. At this time, a thickness t from the cut surface and outer surface of the half-split sample 2 is preferably controlled to be within a range of ±5% an external radius r of the steel pipe.

Then, an outer layer of the inner surface of the pipe is removed by within a range of 10 μm or smaller by electropolishing, and thereafter the circumferential-direction residual stress on the inner surface of the pipe is measured. As a method for the measurement, the $\sin^2 \psi$ method with X-ray diffraction is used to perform the method in conformity with Non Patent Document 2.

2. Chemical Composition

There are no special limitations on the chemical composition of the steel pipe according to the present invention and a steel pipe starting material being a starting material of the steel pipe as long as the chemical composition satisfies the conditions of the above tensile strength and yield ratio. For example, the chemical composition preferably consists of, by mass percent, C: 0.12 to 0.27%, Si: 0.05 to 0.50%, Mn: 0.3 to 2.0%, Al: 0.005 to 0.060%, N: 0.0020 to 0.0080%, Ti: 0.005 to 0.040%, Nb: 0.015 to 0.045%, Cr: 0 to 1.0%, Mo: 0 to 1.0%, Cu: 0 to 0.5%, Ni: 0 to 0.5%, V: 0 to 0.15%, B: 0 to 0.005%, and the balance: Fe and impurities, and contents of Ca, P, S, and O in the impurities being Ca: 0.001% or less, P: 0.02% or less, S: 0.01% or less, and O: 0.0040% or less.

The term "impurities" herein means components that are mixed in steel in producing the steel industrially due to various factors including raw materials such as ores and scraps, and a producing process, and are allowed to be mixed in the steel within ranges in which the impurities have no adverse effect on the present invention.

The reasons for restricting the elements are as described below. In the following explanation, the symbol "%" for the content of each element means "% by mass".

C: 0.12 to 0.27%

C (carbon) is an element that is effective for increasing the strength of steel inexpensively. To ensure a desired tensile strength, it is preferable to set the content of C of 0.12% or more. However, the content of C of more than 0.27% may result in a decrease in workability. Therefore, the content of C is preferably set at 0.12 to 0.27%. The content of C is more preferably 0.13% or more, still more preferably 0.14% or more. In addition, the content of C is more preferably 0.25% or less, still more preferably 0.23% or less.

Si: 0.05 to 0.50%

Si (silicon) is an element that has not only a deoxidation function but also a function of improving the strength of steel. To ensure these effects, it is preferable to set the content of Si of 0.05% or more. However, the content of Si of more than 0.50% may result in a decrease in toughness. Therefore, the content of Si is preferably set at 0.05 to 0.50%. The content of Si is more preferably 0.15% or more and is more preferably 0.35% or less.

Mn: 0.3 to 2.0%

Mn (manganese) is an element that not only has a deoxidation function but also is effective in improving the strength and toughness of steel. However, the content of Mn of less than 0.3% cannot provide a sufficient strength, and on the other hand, the content of Mn of more than 2.0% causes a MnS to coarsen, and to elongate and expand sometimes in hot rolling, which may result in a decrease in toughness instead. For this reason, the content of Mn is preferably set at 0.3 to 2.0%. The content of Mn is more preferably 0.4% or more, still more preferably 0.5% or more. In addition, the content of Mn is more preferably 1.7% or less, still more preferably 1.5% or less.

Al: 0.005 to 0.060%

Al (aluminum) is an element that is effective in deoxidizing steel and has a function of increasing the toughness and workability of steel. To obtain these effects, it is preferable to contain Al of 0.005% or more. On the other hand, when the content of Al becomes more than 0.060%, inclusions easily form, and in particular, in the case of a steel containing Ti, the risk of causing Ti—Al complex inclusions to form is increased. Therefore, the content of Al is preferably set at 0.005 to 0.060%. The content of Al is more preferably 0.008% or more, still more preferably 0.010% or more. In addition, the content of Al is more preferably 0.050% or less, still more preferably 0.040% or less. In the present invention, the content of Al means the content of acid-soluble Al (sol. Al).

N: 0.0020 to 0.0080%

N (nitrogen) is an element that inevitably exists in steel as an impurity. However, in the present invention, it is preferable to make N of 0.0020% or more remain for the purpose of preventing grains from coarsening by the pinning effect of TiN. In contrast, the content of N of more than 0.0080% increases the risk of causing large Ti—Al complex inclusions to form. Therefore, the content of N is preferably set at 0.0020 to 0.0080%. The content of N is more preferably 0.0025% or more, still more preferably 0.0027% or more. In addition, the content of N is more preferably 0.0065% or less, still more preferably 0.0050% or less.

Ti: 0.005 to 0.040%

Ti (titanium) contributes to preventing grains from coarsening by finely precipitating in the form of TiN and the like. To obtain the effect, it is preferable to set the content of Ti at 0.005% or more. In contrast, the content of Ti more than 0.040% causes inclusions of nitrogen compounds to be formed in the steel pipe, which may result in a decrease in toughness. Therefore, the content of Ti is preferably set at 0.005 to 0.040%.

When an internal pressure fatigue test on a sample is conducted herein, a fatigue crack develops and propagates from the inner surface of the sample, having a high stress, as an originating point, and fracture occurs as the fatigue crack reaches the outer surface of the sample. At this time, inclusions are present in some cases at the originating portion and absent in other cases.

When inclusions are absent in the originating portion, a flat fracture surface mode, called a facet fracture surface, is recognized there. This is formed by the propagation of a crack, initiated on a per grain basis, over several grains therearound in a shearing mode called Mode II. When this facet fracture surface grows to its critical level, the propagation mode thereof changes to an opening mode called Mode I, resulting in a breakage. The growth of the facet fracture surface depends on a prior-austenite grain diameter (hereafter, referred to as a prior γ grain diameter) or a ferrite grain diameter, which is a dimension unit of initial crack development, and the growth is promoted when the prior γ grain diameter or the ferrite grain diameter is large. This means that a large prior γ grain diameter or ferrite grain diameter leads to a decrease in the fatigue strength of a matrix structure even when inclusions do not serve as an originating point.

As described above, the content of Ti is preferably set at 0.005% or more so as to prevent prior γ grain or ferrite grain diameter from coarsening. The content of Ti is preferably 0.006% or more, more preferably 0.007% or more.

In contrast, when the content of Ti is high, complex inclusions was observed through fracture surface observation on a steel pipe having been subjected to the internal pressure fatigue test, the complex inclusions including a plurality of $Al_2O_3$-based inclusions having diameters of 20 μm or less that are bridged by film-shaped thin layers containing Ti as a main component (hereafter, referred to as Ti—Al complex inclusions). In particular, the content of Ti more than 0.015% may lead to the risk of causing large Ti—Al complex inclusions to form. The large Ti—Al complex inclusions may lead to a decrease in a breakage life under conditions where an internal pressure is a very high. Therefore, the content of Ti is more preferably 0.015% or less. The content of Ti is further preferably 0.013% or less, still more preferably 0.012% or less.

Nb: 0.015 to 0.045%

Nb (niobium) finely disperses in steel as carbide or carbo-nitride and has an effect of firmly pinning crystal grain boundaries. In addition, the fine dispersion of Nb carbide or Nb carbo-nitride improves the strength and toughness of steel. For the purpose of the above, it is preferable to contain Nb of 0.015% or more. In contrast, the content of Nb of more than 0.045% causes coarsening of carbide and the carbo-nitride, which may result in a decrease in toughness instead. Therefore, the content of Nb is preferably set at 0.015 to 0.045%. The content of Nb is more preferably 0.018% or more, still more preferably 0.020% or more. In addition, the content of Nb is still preferably 0.040% or less, more preferably 0.035% or less.

Cr: 0 to 1.0%

Cr (chromium) is an element that has an effect of improving the strength and wear resistance. However, the content of Cr of more than 1.0% may result in a decreased toughness and cold rolling workability. Therefore, the content of Cr is preferably set at 1.0% or less. The content of Cr is more preferably 0.8% or less. In order to obtain the above effect, the content of Cr is preferably set at 0.2% or more, more preferably 0.3% or more.

Mo: 0 to 1.0%

Mo (molybdenum) is an element that contributes to securing a high strength through being dissolved and precipitating carbides. However, if the content of Mo is more than 1.0% the effect of Mo is saturated resulting in an increase in alloy cost. Therefore, the content of Mo is preferably set at 1.0% or less, and more preferably 0.45% or less. In order to obtain the above effect, the content of Mo is preferably set at 0.03% or more, more preferably 0.08% or more.

Cu: 0 to 0.5%

Cu (copper) is an element that has an effect of improving the strength and toughness of the steel. However, if the content of Cu is more than 0.5% the effect of Cu is saturated leading to a rise in an alloy cost as a result. Therefore, the content of Cu is preferably set at 0.5% or less, more preferably set at 0.40% or less, and still more preferably 0.35% or less. In order to obtain the above effect, the content of Cu is preferably set at 0.03% or more, more preferably 0.05% or more.

Ni: 0 to 0.5%

Ni (nickel) is an element that has an effect of improving the strength and toughness of the steel. However, if the content of Ni is more than 0.5% the effect of Ni is saturated leading to a rise in an alloy cost as a result. Therefore, the content of Ni is preferably set at 0.5% or less, more preferably set at 0.40% or less, and still more preferably 0.35% or less. In order to obtain the above effect, the content of Ni is preferably set at 0.03% or more, more preferably 0.08% or more.

V: 0 to 0.15%

V (vanadium) is an element that contributes to increasing the strength and the toughness of steel through forming carbides or carbo-nitrides. However, the content of V of more than 0.15% may result in a decreased toughness instead. Therefore, the content of V is preferably set at 0.15% or less, more preferably set at 0.12% or less, and still more preferably 0.10% or less. In order to obtain the above effect, the content of V is preferably set at 0.02% or more, more preferably 0.04% or more.

B: 0 to 0.005%

B (boron) is a grain boundary strengthening element, contributing to the enhancement of the toughness. However, the content of B of more than 0.005% may result in a decreased toughness instead. Therefore, the content of B is preferably set at 0.005% or less, and more preferably set at 0.002% or less. The hardenability improvement function owing to containing B can be obtained at the content of an impurity level, but in order to obtain the effect more prominently, the content of B is preferably set at 0.0003% or more. Note that, in order to effectively utilize the effect of B, N in steel is preferably immobilized by Ti.

Ca, P, S, and O in the impurities will be described below.

Ca: 0.001% or less

Ca (calcium) has a function of agglomerating silicate-based inclusions (Group C in JIS G 0555), and the content of Ca of more than 0.001% may result in a decrease in critical internal pressure because coarse C type inclusions are generated. Therefore, the content of Ca is preferably set at 0.001% or less, more preferably set at 0.0007% or less, and still more preferably 0.0003% or less. Note that if no Ca treatment is made at all in a facility relating to steel producing and refining for a long term, Ca contamination of the facility can be eliminated, and thus it is possible to make the content of Ca in steel substantially 0%.

P: 0.02% or less

P is an element that inevitably exists in steel as an impurity. The content of P of more than 0.02% may not only lead a risk of causing a decrease in hot workability but also bringing about grain-boundary segregation to significantly decrease toughness. Therefore, it is preferable to set the content of P at 0.02% or less. The lower the content of P is, the more desirable it is, and the content of P is more preferably set at 0.015% or less, still more preferably 0.012% or less. However, the lower limit of the content of P is preferably set at 0.005% because an excessive decrease in the content of P leads to an increase in production cost.

S: 0.01% or less S (sulfur) is an element that, as with P, inevitably exists in steel as an impurity.

The content of S of more than 0.01% causes S to segregate at grain boundaries and causes sulfide-based inclusions to form, being prone to lead to a decrease in fatigue strength. Therefore, it is preferable to set the content of S at 0.01% or less. The lower the content of S is, the more desirable it is, and the content of S is more preferably set at 0.005% or less, still more preferably 0.0035% or less. However, the lower limit of the content of S is preferably set at 0.0005% because an excessive decrease in the content of S leads to an increase in production cost.

O: 0.0040% or less

O forms coarse oxides, being prone to cause a decrease in critical internal pressure due to the formation. From such a viewpoint, it is preferable to set the content of O at 0.0040% or less. The lower the content of O is, the more desirable it is, and the content of O is more preferably set at 0.0035% or less, still more preferably 0.0025% or less, farther more preferably 0.0015% or less. However, the lower limit of the content of O is preferably set at 0.0005% because an excessive decrease in the content of O leads to an increase in production cost.

3. Metal Micro-Structure

There are no special specifications on the metal micro-structure of the steel pipe for fuel injection pipe according to the present invention, but the metal micro-structure is preferably consisting of one or more kinds selected from ferrite, pearlite, and bainite. The metal micro-structure may include martensite, but a structure mainly consisting of martensite makes it difficult to set the yield ratio of the steel pipe starting material at 0.85 or lower. In contrast, retained austenite may be included in the structure because the retained austenite has an action of decreasing the yield ratio of the steel pipe starting material.

4. Size

The steel pipe for fuel injection pipe according to the present invention is not specially limited in sizes. However, a fuel injection pipe typically needs to have a certain amount of volume to reduce fluctuations in inside pressure in use. For this reason, the steel pipe for fuel injection pipe desirably has an inner diameter of 2.5 mm or more, more desirably 3 mm or more. In addition, a fuel injection pipe needs to withstand a high internal pressure, and the wall thickness of the steel pipe is desirably 1.5 mm or more, more desirably 2 mm or more. In contrast, an excessively large outer diameter of the steel pipe makes bending work or the like difficult. For this reason, the outer diameter of the steel pipe is desirably 20 mm or less, more desirably 10 mm or less.

Furthermore, to withstand a high internal pressure, it is desirable to make the wall thickness larger for a larger inner diameter of the steel pipe. With the inner diameter of the steel pipe constant, the outer diameter of the steel pipe is made larger with an increase in wall thickness. In other words, to withstand a high internal pressure, it is desirable to make the outer diameter of the steel pipe with an increase in the inner diameter of the steel pipe. In order to obtain a sufficient critical internal pressure for a steel pipe for fuel injection pipe, it is desirable that the outer diameter and the inner diameter of the steel pipe satisfy the following formula (iii):

$$D/d \geq 1.5 \qquad \text{(iii)}$$

where, in the above formula (iii), D denotes the outer diameter (mm) of the steel pipe for fuel injection pipe, and d denotes the inner diameter (mm) of the steel pipe for fuel injection pipe.

$D/d$, which is the ratio of the outer diameter to the inner diameter of the above steel pipe, is more desirably 2.0 or more. In contrast, the upper limit of $D/d$ is not specially provided, but it is desirably 3.0 or less, more desirably 2.8 or less because an excessively large value of $D/d$ makes bending work difficult.

5. Method for Producing Steel Pipe for Fuel Injection Pipe

There are no special limitations on methods for producing the steel pipe for fuel injection pipe according to the present invention. For example, the steel pipe for fuel injection pipe can be produced by performing auto-frettage treatment on a steel pipe starting material that has a tensile strength of 500 to 900 MPa and a yield ratio of 0.50 to 0.85.

If the steel pipe starting material has a tensile strength lower than 500 MPa, it is difficult to obtain a critical internal pressure necessary to be used as a fuel injection pipe even when the auto-frettage treatment is performed thereafter. On the other hand, if the steel pipe has a tensile strength higher than 900 MPa, there arises a problem of a decrease in workability. In addition, to obtain a tensile strength higher than 900 MPa, a process to increase the strength of the steel pipe, such as quenching, is needed in many cases, which then increase producing costs. In addition, when the steel pipe is quenched to have a structure of an extremely high martensite ratio, it is relatively difficult to control the yield ratio thereof to be 0.85 or lower. The tensile strength of the steel pipe starting material is preferably 650 MPa or higher and preferably 800 MPa or lower.

The burst resistance performance of a steel pipe is substantially proportionate to the sum of the tensile strength and the yield strength of the steel pipe. Therefore, an extremely low yield ratio may cause a burst to cause during the auto-frettage treatment. In particular, when the steel pipe has a yield ratio less than 0.50, the burst resistance performance of the steel pipe cannot be secured. Meanwhile, to obtain a high advantageous effect of improving the critical internal pressure even at a low auto-frettage treatment pressure, it is necessary to use a steel pipe starting material having a low yield ratio. Therefore, the yield ratio of the steel pipe starting material is set at 0.85 or lower.

Through the auto-frettage treatment, the steel pipe does not change largely in tensile strength and yield strength, except for the inner surface of the steel pipe. Therefore, by adjusting the mechanical property of the steel pipe starting material within the above range, it is possible to control the mechanical property of the steel pipe for fuel injection pipe within a specified range.

In addition, to decrease the running costs of an auto-frettage treatment device, an auto-frettage treatment pressure is preferably suppressed as low as possible so as not to pose loads on the device. Therefore, in a production method according to an embodiment of the present invention, an auto-frettage treatment pressure PA is set at 450 MPa or lower.

Furthermore, as described above, the burst resistance performance of a steel pipe is substantially proportionate to the sum of the tensile strength and the yield strength of the steel pipe. To avoid the occurrence of a burst during the auto-frettage treatment, the auto-frettage treatment pressure $P_{AF}$ preferably satisfies the following formula (iv), in the relation between the tensile strength TS and the yield ratio YR of the steel pipe starting material:

$$P_{AF} < 0.44 \times TS \times (1+YR) \quad (iv)$$

where, in the above formula (iv), $P_{AF}$ denotes an auto-frettage treatment internal pressure (MPa), TS denotes the tensile strength (MPa) of the steel pipe starting material, and YR denotes the yield ratio of the steel pipe starting material.

Although there are no special limitations on the lower limit of the auto-frettage treatment pressure, the lower limit is preferably a pressure set to be higher than the lower limit value of the above critical internal pressure, $0.41 \times TS \times \alpha$.

6. Method for Producing Steel Pipe Starting Material

There are no special limitations on methods for producing the steel pipe starting material according to the present invention, and for example, in the case of using a seamless steel pipe for the production, it is possible to produce the steel pipe by preparing an ingot in which inclusions are suppressed in advance by the following method, producing a material pipe from the ingot by a technique such as Mannesmann pipe making, giving desired size and a desired shape to the material pipe by cold rolling, and thereafter performing heat treatment.

In order to suppress the formation of inclusions, it is preferable to adjust the chemical composition as described above as well as to increase the cross-sectional area of a cast piece in casting. This is because, after casting, large inclusions float up until solidification. The cross-sectional area of a cast piece in casting is desirably 200,000 mm$^2$ or more. Furthermore, it is possible to decrease directly nonmetallic inclusions in steel by decreasing a casting speed to cause lightweight nonmetallic inclusions to float up as slag. For example, continuous casting can be carried out at a casting speed of 0.5 m/min.

On the basis of the above method, detrimental coarse inclusions are removed, but Ti—Al complex inclusions may be formed depending on the content of Ti in steel. It is presumed that the Ti-A1 complex inclusions are formed in the course of the solidification. As described above, it is possible to prevent the formation of coarse complex inclusions by setting the content of Ti at 0.015% or less.

From the cast piece obtained in such a manner, a billet for pipe-making by a method such as blooming is prepared, for example. Then, for example, the billet is subjected to piercing rolling and elongating rolling in the Mannesmann-mandrel mill pipe-making process, and finished to predetermined hot-rolling-process size by sizing using a stretch reducing mill or the like. Subsequently, cold drawing is repeated several times to give predetermined cold finishing size. The cold drawing can be performed with ease by performing stress relief annealing before or in the middle of the cold drawing. In addition, it is possible to employ the other pipe-making processes such as a plug mill pipe-making process.

After performing final cold drawing working in such a manner, by performing, for example, heat treatment such as normalizing, it is possible to secure desired tensile strength and yield ratio.

In normalizing treatment, it is preferable to perform heating up to a temperature range from the Ac$_3$ transformation point to 1200° C. and to allow cooling thereafter. A heating temperature less than the Ac$_3$ transformation point leads to incomplete austenitization, and results in an insufficiently uniformized structure as well as insufficient dispersion of carbides and precipitates, which makes it difficult to obtain desired tensile strength and yield ratio. On the other hand, a heating temperature more than 1200° C. coarsens austenite grains, which may lead to decreases in fatigue strength and toughness. To decrease the yield ratio of the steel pipe starting material, it is preferable to lower the heating temperature, more preferably to lower the heating temperature to 1050° C. or lower.

A heating method is not specially limited, but heating at a high temperature and for a long time causes, unless performed in a protective atmosphere, a lot of scales to be generated on a steel pipe surface, leading to a decrease in dimensional accuracy and in surface texture. Therefore, it is preferable to make a holding time as short as about 10 to 20 min in the case of furnace heating using a walking beam furnace or the like. From the viewpoint of suppressing scales, it is preferable to use, as a heating atmosphere, an atmosphere having a low oxygen potential or a reducing atmosphere, which is non-oxidizing.

If a high-frequency induction heating method or a direct resistance heating method as a heating method is employed, the heating with short time holding is thereby achieved, enabling the suppression of scales generated on a steel pipe surface to a minimum.

Hereunder, the present invention is explained more specifically with reference to examples; however, the present invention is not limited to these examples.

EXAMPLE

Example 1

There were five kinds of steels Nos. 1 to 5 manufactured using a converter and continuous casting, the steels having chemical components shown in Table 1. In the continuous casting, a casting speed in casting was set at 0.5 m/min and the cross-sectional area of a cast piece was set at 200,000 mm$^2$ or more. A billet for pipe making was produced from the steel describe above, subjected to piercing and elongating rolling in the Mannesmann-mandrel pipe-making process, and subjected to a hot rolling process by sizing using a stretch reducing mill, to have dimensions of an outer diameter of 34 mm, and a wall thickness of 4.5 mm. To draw this hot finished material pipe, nosing was first performed on a front end of the material pipe, and lubricant was applied. Subsequently, the drawing was performed using a die and a plug, softening annealing was performed as necessary, and the pipe diameter was gradually decreased to finish the material pipe as a steel pipe having an outer diameter of 6.35 mm and an inner diameter of 3.0 mm.

TABLE 1

| Steel | Chemical composition (by mass %, balance: Fe and impurities) | | | | | | | | | | | | | | | | |
|---|---|---|---|---|---|---|---|---|---|---|---|---|---|---|---|---|---|
| No. | C | Si | Mn | Al | N | Ti | Nb | Cr | Mo | Cu | Ni | V | B | Ca | P | S | O |
| 1 | 0.21 | 0.33 | 1.43 | 0.028 | 0.0044 | 0.020 | 0.035 | 0.05 | 0.18 | 0.02 | 0.03 | 0.06 | — | 0.0001 | 0.014 | 0.0040 | 0.0012 |
| 2 | 0.17 | 0.29 | 1.43 | 0.036 | 0.0040 | 0.022 | — | 0.06 | 0.01 | 0.01 | 0.02 | 0.06 | — | 0.0001 | 0.013 | 0.0050 | 0.0010 |
| 3 | 0.15 | 0.22 | 0.51 | 0.015 | 0.0030 | 0.008 | — | 0.02 | 0.76 | 0.30 | — | — | — | 0.0001 | 0.011 | 0.0012 | 0.0012 |
| 4 | 0.18 | 0.31 | 1.40 | 0.024 | 0.0047 | 0.009 | 0.0240 | 0.04 | 0.18 | 0.04 | 0.02 | 0.06 | — | 0.0003 | 0.014 | 0.0040 | 0.0011 |
| 5 | 0.21 | 0.33 | 1.43 | 0.028 | 0.0044 | 0.020 | 0.035 | 0.05 | 0.18 | 0.02 | 0.03 | 0.06 | — | 0.0001 | 0.014 | 0.0040 | 0.0012 |

Thereafter, the steel Nos. 1, and 3 to 5 were subjected to normalizing treatment under the condition of air cooling after holding at 980° C.×60 min, and the steel No. 2 was subjected to stress relief annealing under the condition of slow cooling after holding at 570° C.×30 min. Thereafter, descaling and smoothing processes were performed on the outer and inner surfaces of the steel pipes.

A sample for metal micro-structure observation was taken from each steel pipe, and a cross section perpendicular to the pipe axis direction thereof was subjected to mechanical polishing. The above sample was polished using emery paper and buff, a metal micro-structure was made to appear using Nital etchant and observed. Then, for all of the samples, it was confirmed that the metal micro-structure was a metal micro-structure including bainite, ferrite, and pearlite.

In addition, a sample with a length of 300 mm was cut out from the obtained steel pipe, and areas extending from both ends of the sample by a length of 100 mm were chucked by oil pressure with contact pads each provided with a V groove interposed therebetween and subjected to the tensile test with an extensometer attached to a parallel portion thereof. Then, the tensile strength and the yield strength were determined, and the yield ratio was calculated. The results of the determination and calculation are shown in Table 2.

TABLE 2

| | Heat treatment | | Tensile | Yield | | Auto-frettage | | Critical internal pressure (MPa) | | | |
|---|---|---|---|---|---|---|---|---|---|---|---|
| Steel No. | Temperature (° C.) | Time (min) | strength (MPa) | strength (MPa) | Yield ratio | treatment pressure (MPa) | Residual stress# (MPa) | Before auto-frettage treatment | After auto-frettage treatment | 0.41TSα (MPa) | |
| 1 | 980 | 60 | 723 | 548 | 0.76 | 350 | −86 | 255 | 310 | 297 | Inventive example |
| 2 | 570 | 30 | 779 | 696 | 0.89 * | 350 | −18 * | 250 | 270 | 320 * | Comparative example |
| 3 | 980 | 60 | 718 | 569 | 0.79 | 350 | −79 | 250 | 295 | 295 | Inventive example |
| 4 | 980 | 60 | 689 | 514 | 0.75 | 320 | −33 | 240 | 290 | 283 | Inventive example |
| 5 | 980 | 60 | 723 | 548 | 0.76 | 280 | −15 * | 255 | 265 | 297 * | Comparative example |

* indicates that conditions do not satisfy those defined by the present invention.
indicates that circumferential-direction residual stress at the middle position of the inner surface of the pipe after auto-frettage treatment and half-splitting in a pipe axis direction As seen from Table 2, the steel pipe starting materials of the steel Nos. 1, and 3 to 5 satisfied the specifications of the present invention in terms of both tensile strength and yield ratio. In contrast, the steel pipe starting material of the steel No. 2 satisfied the specifications of the present invention in terms of tensile strength but had a high yield ratio that fell out of the range of the specification of the present invention.

Figure 2:
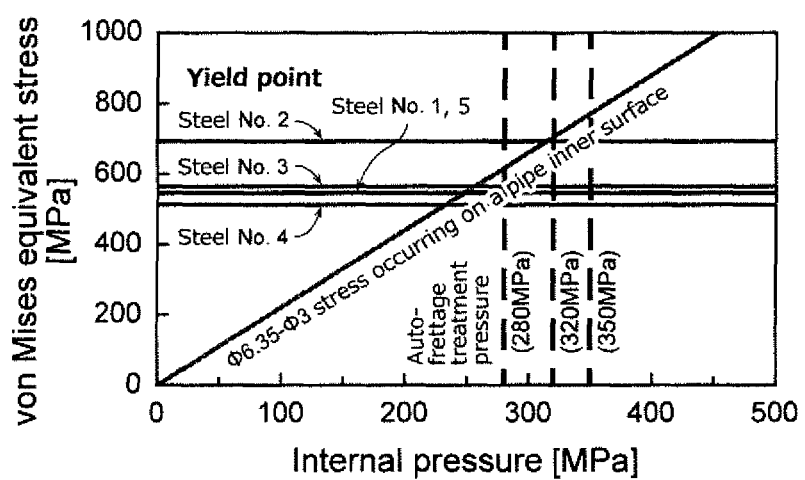
FIG. 2 is a graph for illustrating the relation between von Mises equivalent stress and internal pressure on the inner surface of the steel pipe.

Each steel pipe was cut to have a length of 200 mm, subjected to pipe end working, and made into a plurality of injection pipe specimens for an internal pressure fatigue test. Then, about the half of the injection pipe specimens were subjected to auto-frettage treatment that applies an internal pressure of 350 MPa for the steel Nos. 1 to 3, an internal pressure of 320 MPa for the steel No. 4, and an internal pressure of 280 MPa for the steel No. 5. Note that an internal pressure at which the stress exceeds the yield point on the inner surface of each sample can be estimated from FIG. 2. The internal pressure was 264 MPa for the steel Nos. 1 and 5, having the same composition, 330 MPa for the steel No. 2, 273 MPa for the steel No. 3, and 249 MPa for the steel No. 4.

One of the specimens having subjected to the above auto-frettage treatment was subjected to the measurement of circumferential-direction residual stress on the inner surface of the pipe. First, each specimen was cut off in a direction perpendicular to the pipe axis using a micro cutter, whereby a sample having a length L of 30 mm as illustrated in FIG. 1 was obtained. Subsequently, each sample was split in half in the pipe axis direction by the wire electrical discharge machining. A thickness t from the cut surface and outer surface of each half-split sample fell within a range of 3.175±0.1 mm, which was about ±3.1% of an external radius r of the steel pipe.

Then, an outer layer of the inner surface of the pipe is removed by within a range of 10 μm or smaller by electropolishing, and thereafter the circumferential-direction residual stress at the middle position of the inner surface of the pipe is measured. As a method for the measurement, the $\sin^2 \psi$ method with X-ray diffraction was used to perform the method in conformity with Non Patent Document 2. Detailed measurement conditions are as follows.

Scanning method: Side inclination method, constant η method (PSPC method)
X-ray stress measurement apparatus: PSPC-RSF from Rigaku Corporation
Characteristic X-ray: Crkα
Measurement diffraction plane: α-Fe211
Entrance slit: Single collimator, Diameter 0.3 mm
Incidence angle (ψ): 0°, 12.9°, 18.5°, 22.8°, 26.60, 30°, 33.3°, 36.30, 39.3°
Incidence angle (ψ): $\psi_P$ axis fluctuation ±30
Diffraction angle determination method: Half-value width method
Stress constant (K): −318 MPa/°

The results of measuring the circumferential-direction residual stress on the inner surface of the pipe are also shown in Table 2.

Figure 3:
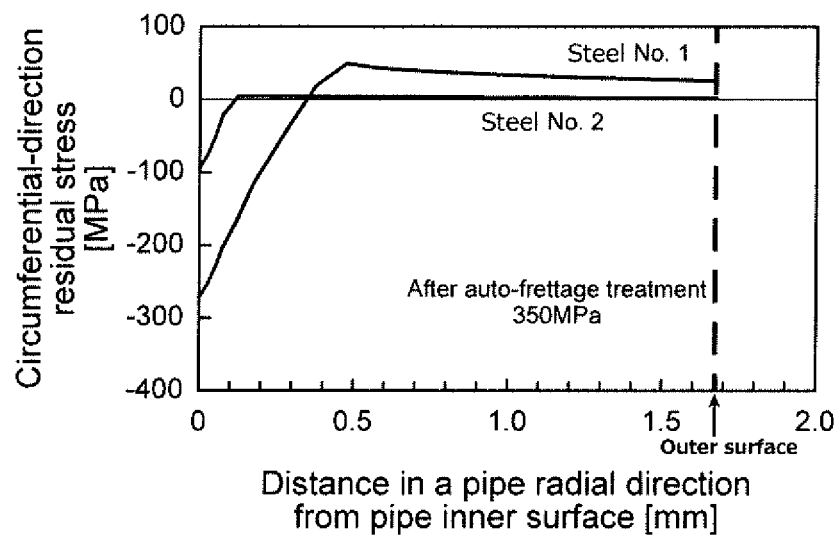
FIG. 3 is a graph illustrating distributions of residual stresses given by performing auto-frettage treatment on steel Nos. 1 and 2 in Example, the residual stresses being obtained by Finite Element (FE) analysis.

In addition, the compressive residual stress applied to the inner surface of the steel pipe by the auto-frettage treatment was estimated using the FE analysis. As seen from FIG. 3, the steel pipe starting material of the steel No. 1 that satisfied the specifications of the present invention was subjected to the auto-frettage treatment with an internal pressure of 350 MPa, with the result that a compressive residual stress of −270 MPa occurred. In contrast, in a steel pipe material pipe of the steel No. 2, a compressive residual stress of −90 MPa occurred, the absolute value of which was smaller than that of the steel No. 1. In the steel No. 2, the internal pressure at which the stress exceeds the yield point on the inner surface is high as compared with that in the steel No. 1 and the difference with the auto-frettage treatment pressure is small. Therefore, it is considered that the amount of plastic deformation of the steel No. 2 was small as compared with that of the steel No. 1.

The measured values of the circumferential-direction residual stress on the inner surface of the pipe shown in Table 2 were −86 MPa for the steel No. 1, and −18 MPa for the steel No. 2. The absolute values of the measured values tended to be small as compared with the estimated values obtained by the above FE analysis. However, the magnitude relation between the steel No. 1 and the steel No. 2 was kept. Therefore, it is determined that the measured value of the circumferential-direction residual stress on the inner surface of the pipe after the half-splitting is useful as an index to assess whether the internal pressure fatigue properties of a steel pipe subjected to the auto-frettage treatment is good or poor.

Figure 4:
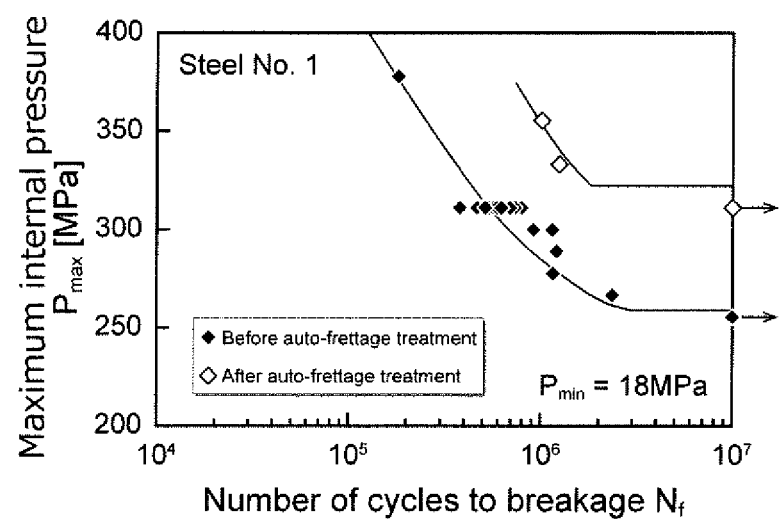
FIG. 4 is a graph illustrating the results of an internal pressure fatigue test for a steel No. 1 in Example.
Figure 5:
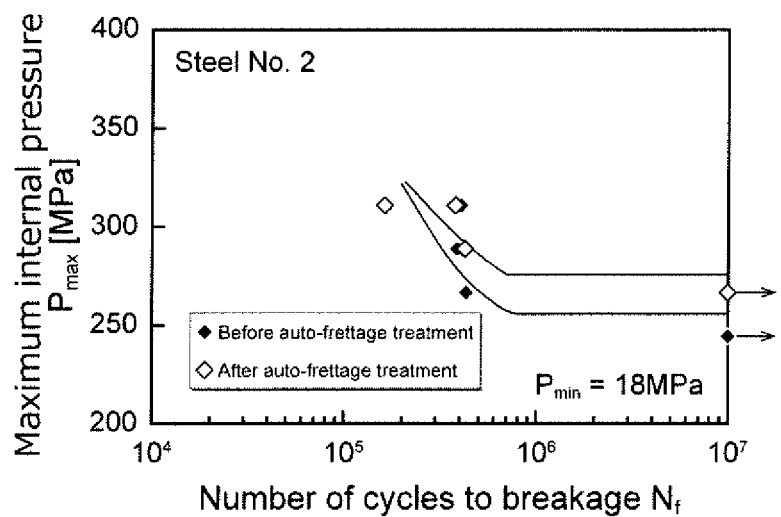
FIG. 5 is a graph illustrating the results of an internal pressure fatigue test for a steel No. 2 in Example.
Figure 6:
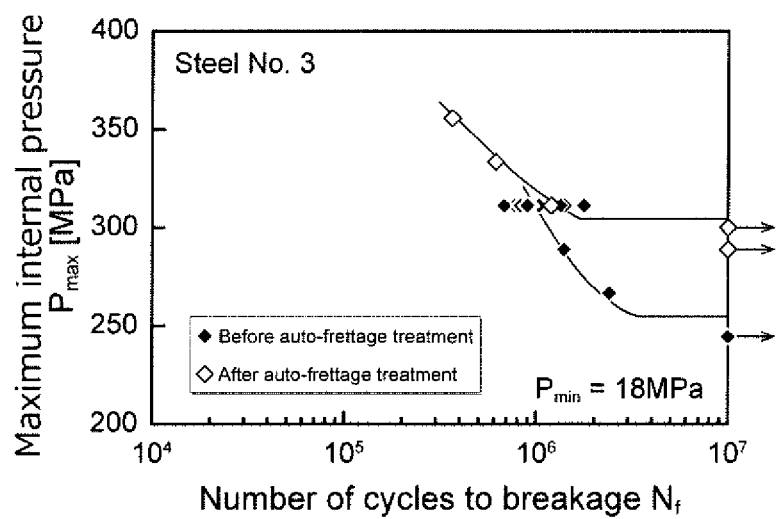
FIG. 6 is a graph illustrating the results of an internal pressure fatigue test for a steel No. 3 in Example.

Then, for each sample, the internal pressure fatigue test was conducted using a specimen before subjected to the auto-frettage treatment and another one of the above specimens after subjected to the auto-frettage treatment. The internal pressure fatigue test is a test performed by filling, from one end face of a sample, the inside of the sample with a hydraulic oil, as a pressure medium, with the other end face sealed, and repeatedly fluctuating the internal pressure of a filled portion in the range from a maximum internal pressure to a minimum of 18 MPa such that the internal pressure follows a sine wave over time. The frequency of the internal pressure fluctuations was set at 8 Hz. The critical internal pressure was defined as the maximum internal pressure within which no breakage (leak) occurs with possibility of 50% even when the number of cycles reaches $10^7$ cycles as the result of the internal pressure fatigue test. That is, the critical internal pressure was determined, on S-N diagrams illustrated in FIGS. 4 to 6, of which the vertical axes represent maximum internal pressure, and the horizontal axes represent the number of cycles to breakage, in the form of the middle value between the minimum value of maximum internal pressures within which breakage occurred and the maximum value of the maximum internal pressures within which no breakage occurred even when the number of cycles reached $10^7$.

The results of the experiment on the critical internal pressure and the calculated values of 0.41×TS×α are also shown in Table 2. As seen from Table 2 as well as FIGS. 4 and 6, the steel Nos. 1 and 3, which were produced under the conditions satisfying the specifications of the present invention, increased in critical internal pressures by 22% and 18%, respectively, to be values higher than the value of 0.41×TS×α because the steel Nos. 1 and 3 had low yield ratios and were given high compressive residual stresses through the auto-frettage treatment. In addition, the steel No. 4 also had a low yield ratio and was given a relatively high compressive residual stress through the auto-frettage treatment. Therefore, the critical internal pressure was increased by 21%, to be a value higher than the value of 0.41×TS×α.

In contrast, as to the steel No. 2, the yield ratio of the steel pipe starting material was high and did not satisfy the specifications of the present invention. Thus, even when the auto-frettage treatment was performed, the compressive residual stress to be given was low, the rate of increase in critical internal pressure was less than 10%, and the critical internal pressure was lower than the value of 0.41×TS×α. In addition, as to the steel No. 5, while the yield ratio of the steel pipe starting material was low because of having the same composition as that of the steel No. 1, the auto-frettage treatment pressure was rather low, 280 MPa. Thus, even when the auto-frettage treatment was performed, the compressive residual stress to be given was low, the rate of increase in critical internal pressure was less than 10%, and the critical internal pressure was lower than the value of 0.41×TS×α.

<Reference Experiment 1>

As a producing condition for decreasing the yield ratio of the steel pipe starting material, studies were conducted focusing on the normalizing temperature. Steel Nos. 6 and 7 having the chemical composition shown in Table 3 were finished into steel pipes by the same method as in Example 1, and thereafter, for each steel pipe, the normalizing treatment was conducted at two different temperature conditions, 1000° C. and 920° C.

TABLE 3

| Steel No. | Chemical composition (by mass %, balance: Fe and impurities) | | | | | | | | | | | | | | | | |
|---|---|---|---|---|---|---|---|---|---|---|---|---|---|---|---|---|---|
| | C | Si | Mn | Al | N | Ti | Nb | Cr | Mo | Cu | Ni | V | B | Ca | P | S | O |
| 6 | 0.21 | 0.32 | 1.42 | 0.032 | 0.0037 | 0.021 | 0.034 | 0.06 | 0.18 | 0.03 | 0.02 | 0.06 | 0.0001 | 0.0001 | 0.014 | 0.0030 | 0.0009 |
| 7 | 0.21 | 0.31 | 1.43 | 0.036 | 0.0048 | — | — | 0.05 | 0.17 | 0.03 | 0.03 | 0.06 | — | 0.0001 | 0.012 | 0.0040 | 0.0011 |

Thereafter, a sample having a length of 300 mm was cut out from each steel pipe, and areas extending from both ends of the sample by a length of 100 mm were chucked by oil pressure with contact pads each provided with a V groove interposed therebetween and subjected to the tensile test with an extensometer attached to a parallel portion thereof. Then, the tensile strength, the yield strength, and the yield ratio were determined. The results of the determination are shown in Table 4.

TABLE 4

| Steel No. | Normalizing temperature (° C.) | Tensile strength (MPa) | Yield strength (MPa) | Yield ratio |
|---|---|---|---|---|
| 6 | 1000 | 678 | 465 | 0.69 |
| | 920 | 687 | 448 | 0.65 |
| 7 | 1000 | 686 | 527 | 0.77 |
| | 920 | 707 | 527 | 0.75 |

As seen from Table 4, the result was that, in the case where the normalizing temperature was set at 920° C., the yield ratios of all the steels decreased as compared with the case where the normalizing temperature was set at 1000° C. This is considered due to the precipitations of VC, V(C,N), VN, and the like that were not melted completely during a temperature rise in the normalizing, which decreased the amount of fine precipitates that reprecipitated thereafter. From this consideration, it is understood that, to decrease the yield ratio, setting the normalizing temperature at a low temperature is effective.

<Reference Experiment 2>

Next, a reference experiment to investigate the influence of the content of Ti on the occurrence of a fatigue crack was conducted. Three kinds of starting materials A, B, and C having chemical compositions shown in Table 5 were manufactured with a converter and continuous casting. In the continuous casting, a casting speed in casting was set at 0.5 m/min and the cross-sectional area of a cast piece was set at 200,000 mm² or more. The obtained slab was subjected to blooming into a billet for pipe making, and a material pipe was produced by subjecting the billet to piercing rolling and elongating rolling in the Mannesmann-mandrel pipe-making process and to sizing using a stretch reducing mill. Then, annealing and cold drawing were repeated a plurality of times to subject the material pipe to diameter reduction into a predetermined finish size, and thereafter normalizing treatment was performed. At this time, the normalizing treatment was carried out under the condition of air cooling after holding at 980° C.×60 min. Then, the material pipe was cut into a predetermined length, subjected to pipe end working, and made into an injection pipe product specimen for internal pressure fatigue test. The tensile strength of the steel A was 718 MPa, that of the steel B was 685 MPa, and that of the steel C was 723 MPa. Note that since the objective of this reference experiment is to investigate the relation between the content of Ti and how a fatigue crack occurs. Thus, the auto-frettage treatment was not performed on purpose so that a lot of tests can be conducted efficiently.

TABLE 5

| Steel | Chemical composition (by mass %, balance: Fe and impurities) | | | | | | | | | | | | | | | | |
|---|---|---|---|---|---|---|---|---|---|---|---|---|---|---|---|---|---|
| | C | Si | Mn | Al | N | Ti | Nb | Cr | Mo | Cu | Ni | V | B | Ca | P | S | O |
| A | 0.15 | 0.22 | 0.51 | 0.015 | 0.0030 | 0.008 | 0.022 | 0.76 | 0.30 | — | — | — | — | 0.0001 | 0.011 | 0.0012 | 0.0012 |
| B | 0.20 | 0.31 | 1.42 | 0.037 | 0.0032 | 0.010 | 0.031 | 0.06 | 0.18 | 0.02 | 0.02 | 0.06 | — | 0.0001 | 0.014 | 0.0030 | 0.0010 |
| C | 0.21 | 0.33 | 1.43 | 0.017 | 0.0044 | 0.020 | 0.035 | 0.05 | 0.18 | 0.02 | 0.03 | 0.06 | — | 0.0001 | 0.014 | 0.0040 | 0.0012 |

The dimensions of the samples were an outer diameter of 6.35 mm, an inner diameter of 3.00 mm, and a length of 200 mm. For each sample, 30 samples were used in the internal pressure fatigue test. The conditions of the fatigue test are such that one end face of a sample is sealed, the inside of the sample is filled, from the other end face, with a hydraulic fluid as a pressure medium, and the internal pressure of a filled portion was repeatedly fluctuated within the range from a maximum of 300 MPa to a minimum of 18 MPa. The frequency of the internal pressure fluctuations was set at 8 Hz.

As a result of the internal pressure fatigue test with a maximum internal pressure of 300 MPa, in all the samples, a crack occurred and propagated on an inner surface before the number of cycles reached $2 \times 10^6$ cycles, and a breakage occurred by the crack reaching an outer surface to leak.

For all the broken samples, a fracture surface of a leak occurring portion of the sample was exposed, and the originating portion of the leak occurring portion was observed using a SEM, and the presence/absence of inclusions was identified and the dimensions of the inclusions were measured. The dimensions of the inclusions was calculated in terms of $\sqrt{\text{area}}$ by measuring, through image processing, an area of the inclusions and a maximum width c from the inner surface in a depth direction (a pipe radial direction). Note that, as the $\sqrt{\text{area}}$, the numerical value of smaller one of the square root of the area and $(\sqrt{10}) \cdot c$ is adopted. This definition is based on a concept described in Non Patent Document 3.

The obtained results are shown in Table 6. In the example using the steel C having a high content of Ti, in 14 of the 30 samples, inclusions just below on the inner surface serve as an originating point, and most of the dimensions thereof were 60 μm or less in terms of $\sqrt{\text{area}}$, except for one in which the dimension was 111 μm in terms of $\sqrt{\text{area}}$. These inclusions were Ti—Al complex inclusions. In contrast, in the examples using the steels A and B having low contents of Ti, in all the samples, there were no inclusions at the originating point of the crack, and a matrix structure on the inner surface served as the originating point in all the cases. In this regard, the shortest breakage life was $3.78 \times 10^5$ cycles of the sample of the steel C where the maximum inclusions were detected, while 4.7 to $8.0 \times 10^5$ cycles in the other 29 samples. In contrast, there was no large difference in breakage life between the steels A and B, which was 6.8 to $17.7 \times 10^5$ cycles, and thus the influence of Ti—Al complex inclusions on internal pressure fatigue is obviously recognized. Then, it can be estimated that an increase in the content of Ti causes the precipitation of coarse Ti—Al complex inclusions, which leads to a decrease in internal pressure fatigue.

TABLE 6

| Dimension of inclusion | Number of sample | | |
|---|---|---|---|
| $\sqrt{\text{area}}$ (μm) | A | B | C |
| none | 30 | 30 | 16 |
| <10 | 0 | 0 | 0 |
| ≥10, <20 | 0 | 0 | 0 |
| ≥20, <30 | 0 | 0 | 4 |
| ≥30, <40 | 0 | 0 | 6 |
| ≥40, <50 | 0 | 0 | 2 |
| ≥50, <60 | 0 | 0 | 1 |
| ≥60, <70 | 0 | 0 | 0 |
| ≥70, <80 | 0 | 0 | 0 |
| ≥80, <90 | 0 | 0 | 0 |
| ≥90, <100 | 0 | o | 0 |

TABLE 6-continued

| Dimension of inclusion | Number of sample | | |
|---|---|---|---|
| $\sqrt{\text{area}}$ (μm) | A | B | C |
| ≥100, <110 | 0 | 0 | 0 |
| ≥110, <120 | 0 | 0 | 1 |
| ≥120 | 0 | 0 | 0 |

INDUSTRIAL APPLICABILITY

According to the present invention, it is possible to obtain a steel pipe for fuel injection pipe that exerts a high advantageous effect of improving critical internal pressure even with a relatively low auto-frettage treatment pressure and is excellent in workability and internal pressure fatigue resistance, at low cost. Therefore, the steel pipe for fuel injection pipe produced according to the present invention is suitably applicable especially to a fuel injection pipe for automobiles.

The invention claimed is:
1. A steel pipe for fuel injection pipe, the steel pipe having:
   an outer diameter of 20 mm or less;
   a tensile strength of 500 to 900 MPa and a yield ratio of 0.50 to 0.85; and
   a critical internal pressure satisfying a following formula (i):

$$IP \geq 0.41 \times TS \times \alpha \qquad (i)$$

$$\alpha = [(D/d)^2 - 1]/[0.776 \times (D/d)^2] \qquad (ii)$$

where, in the above formula (i), IP denotes the critical internal pressure (MPa) of the steel pipe, TS denotes the tensile strength (MPa) of the steel pipe, and α is a value expressed by the above formula (ii), and where, in the above formula (ii), D denotes an outer diameter (mm) of the steel pipe, and d denotes an inner diameter (mm) of the steel pipe, and wherein
   a circumferential-direction residual stress on an inner surface of the steel pipe is −20 MPa or lower after the steel pipe is split in half in a pipe axis direction.
2. The steel pipe for fuel injection pipe according to claim 1, wherein the steel pipe has a chemical composition consisting, by mass percent, of
   C: 0.12 to 0.27%,
   Si: 0.05 to 0.50%,
   Mn: 0.3 to 2.0%,
   Al: 0.005 to 0.060%,
   N: 0.0020 to 0.0080%,
   Ti: 0.005 to 0.040%,
   Nb: 0.015 to 0.045%,
   Cr: 0 to 1.0%,
   Mo: 0 to 1.0%,
   Cu: 0 to 0.5%,
   Ni: 0 to 0.5%,
   V: 0 to 0.15%,
   B: 0 to 0.005%, and
   the balance: Fe and impurities, and
   contents of Ca, P, S, and O in the impurities being
   Ca: 0.001% or less,
   P: 0.02% or less,
   S: 0.01% or less, and
   O: 0.0040% or less.

3. The steel pipe for fuel injection pipe according to claim 2, wherein
the chemical composition consists of, by mass percent,
C: 0.12 to 0.27%,
Si: 0.05 to 0.50%,
Mn: 0.3 to 2.0%,
Al: 0.005 to 0.060%,
N: 0.0020 to 0.0080%,
Ti: 0.005 to 0.015%,
Nb: 0.015 to 0.045%,
Cr: 0 to 1.0%,
Mo: 0 to 1.0%,
Cu: 0 to 0.5%,
Ni: 0 to 0.5%,
V: 0 to 0.15%,
B: 0 to 0.005%, and the balance: Fe and impurities, and
contents of Ca, P, S, and O in the impurities being
Ca: 0.001% or less,
P: 0.02% or less,
S: 0.01% or less, and
O: 0.0040% or less.

4. The steel pipe for fuel injection pipe according to claim 2, wherein
the chemical composition contains, by mass percent,
one or more elements selected from
C: 0.12 to 0.27%,
Si: 0.05 to 0.50%,
Mn: 0.3 to 2.0%,
Al: 0.005 to 0.60%
N: 0.0020 to 0.0080%
Ti: 0.0050 to 0.040%,
Nb: 0.015 to 0.045%,
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%; and
the balance: Fe and impurities, and
contents of Ca, P, S, and O in the impurities being
Ca: 0.001% or less,
P: 0.02% or less,
S: 0.01% or less, and
O: 0.0040% or less.

5. The steel pipe for fuel injection pipe according to claim 1, wherein
the outer diameter and the inner diameter of the steel pipe satisfy a following formula (iii):

$$D/d \geq 1.5 \quad \text{(iii)}$$

where, in the above formula (iii), D denotes the outer diameter (mm) of the steel pipe, and d denotes the inner diameter (mm) of the steel pipe.

6. A method for producing a steel pipe for fuel injection pipe according to claim 1, that has a critical internal pressure satisfying a following formula (i), the method comprising
subjecting a steel pipe starting material having an outer diameter of 20 mm or less, a tensile strength of 500 to 900 MPa, and a yield ratio of 0.50 to 0.85 to auto-frettage treatment at an auto-frettage treatment internal pressure that is 450 MPa or lower and satisfies a following formula (iv):

$$IP \geq 0.41 \times TS \times \alpha \ldots \quad \text{(i)}$$

$$\alpha = [(D/d)^2 - 1]/[0.776 \times (D/d)^2] \ldots \quad \text{(ii)}$$

$$P_{AF} < 0.44 \times TS \times (1+YR) \ldots \quad \text{(iv)}$$

where, in the above formula (i), IP denotes a critical internal pressure (MPa) of the steel pipe, TS denotes the tensile strength (MPa) of the steel pipe starting material, and a is a value expressed by the above formula (ii), and where, in the above formula (ii), D denotes an outer diameter (mm) of the steel pipe, and d denotes an inner diameter (mm) of the steel pipe, and where, in the above formula (iv), $P_{AF}$ denotes an auto-frettage treatment internal pressure (MPa), TS denotes the tensile strength (MPa) of the steel pipe starting material, and YR denotes the yield ratio of the steel pipe starting material.

7. The method for producing the steel pipe for fuel injection pipe according to claim 6, wherein
the steel pipe has a chemical composition consisting by mass percent, of
C: 0.12 to 0.27%,
Si: 0.05 to 0.50%,
Mn: 0.3 to 2.0%,
Al: 0.005 to 0.060%,
N: 0.0020 to 0.0080%,
Ti: 0.0050 to 0.0040%,
Nb: 0.015 to 0.045%,
Cr: 0 to 1.0%,
Mo: 0 to 1.0%,
Cu: 0 to 0.5%,
Ni: 0 to 0.5%,
V: 0 to 0.15%,
B: 0 to 0.005%,
the balance: Fe and impurities,
contents of Ca, P, S, and O in the impurities being
Ca: 0.001% or less,
P: 0.02% or less,
S: 0.01% or less, and
O: 0.0040% or less.

8. The steel pipe for fuel injection pipe according to claim 7, wherein the chemical composition consists of, by mass percent,
C: 0.12 to 0.27%,
Si: 0.05 to 0.50%,
Mn: 0.3 to 2.0%,
Al: 0.005 to 0.060%,
N: 0.0020 to 0.0080%,
Ti: 0.005 to 0.015%,
Nb: 0.015 to 0.045%,
Cr: 0 to 1.0%,
Mo: 0 to 1.0%,
Cu: 0 to 0.5%,
Ni: 0 to 0.5%,
V: 0 to 0.15%,
B: 0 to 0.005%, and
the balance: Fe and impurities, and
contents of Ca, P, S, and O in the impurities being
Ca: 0.001% or less,
P: 0.02% or less,
S: 0.01% or less, and
O: 0.0040% or less.

9. The steel pipe for the fuel injection pipe according to claim 7, wherein the chemical composition consists of, by mass percent,
C: 0.12 to 0.27%,
Si: 0.05 to 0.50%,
Mn: 0.3 to 2.0%,
Al: 0.005 to 0.060%,
N: 0.0020 to 0.0080%,
Ti: 0.005 to 0.040%,
Nb: 0.015 to 0.045%, one or more elements selected from:
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%; and
the balance: Fe and impurities, and
contents of Ca, P, S, and O in the impurities being
Ca: 0.001% or less,
P: 0.02% or less,
S: 0.01% or less, and
O: 0.0040% or less.

10. The method for producing the steel pipe for fuel injection pipe according to claim 6, wherein
the outer diameter and the inner diameter of the steel pipe satisfy a following formula (iii):

$$D/d \geq 1.5 \ldots \quad \text{(iii)}$$

where, in the above formula (iii), D denotes the outer diameter (mm) of the steel pip, and d denotes the inner diameter (mm) of the steel pipe.

11. The steel pipe for fuel injection pipe according to claim 3, wherein
the chemical composition contains, by mass percent, one or more elements selected from
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%.

12. The steel pipe for fuel injection pipe according to claim 2, wherein
the outer diameter and the inner diameter of the steel pipe satisfy a following formula (iii):

$$D/d \geq 1.5 \quad \text{(iii)}$$

where, in the above formula (iii), D denotes the outer diameter (mm) of the steel pipe, and d denotes the inner diameter (mm) of the steel pipe.

13. The steel pipe for fuel injection pipe according to claim 3, wherein
the outer diameter and the inner diameter of the steel pipe satisfy a following formula (iii):

$$D/d \geq 1.5 \quad \text{(iii)}$$

where, in the above formula (iii), D denotes the outer diameter (mm) of the steel pipe, and d denotes the inner diameter (mm) of the steel pipe.

14. The steel pipe for fuel injection pipe according to claim 4, wherein
the outer diameter and the inner diameter of the steel pipe satisfy a following formula (iii):

$$D/d \geq 1.5 \quad \text{(iii)}$$

where, in the above formula (iii), D denotes the outer diameter (mm) of the steel pipe, and d denotes the inner diameter (mm) of the steel pipe.

15. The steel pipe for fuel injection pipe according to claim 11, wherein
the outer diameter and the inner diameter of the steel pipe satisfy a following formula (iii):

$$D/d \geq 1.5 \quad \text{(iii)}$$

where, in the above formula (iii), D denotes the outer diameter (mm) of the steel pipe, and d denotes the inner diameter (mm) of the steel pipe.

16. The steel pipe for the fuel injection pipe according to claim 8, wherein the chemical composition contains consists of, by mass percent,
C: 0.12 to 0.27%,
Si: 0.05 to 0.50%,
Mn: 0.3 to 2.0%,
Al: 0.005 to 0.060%,
N: 0.0020 to 0.0080%,
Ti: 0.005 to 0.015%,
Nb: 0.015 to 0.045%,
one or more elements selected from:
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%, and
the balance: Fe and impurities, and
contents of Ca, P, S, and O in the impurities being
Ca: 0.001% or less,
P: 0.02% or less,
S: 0.01% or less, and
O: 0.0040% or less.

17. The method for producing the steel pipe for fuel injection pipe according to claim 7, wherein
the outer diameter and the inner diameter of the steel pipe satisfy a following formula (iii):

$$D/d \geq 1.5 \ldots \quad \text{(iii)}$$

where, in the above formula (iii), D denotes the outer diameter (mm) of the steel pipe, and d denotes the inner diameter (mm) of the steel pipe.

18. The method for producing the steel pipe for fuel injection pipe according to claim 8, wherein
the outer diameter and the inner diameter of the steel pipe satisfy a following formula (iii):

$$D/d \geq 1.5 \ldots \quad \text{(iii)}$$

where, in the above formula (iii), D denotes the outer diameter (mm) of the steel pipe, and d denotes the inner diameter (mm) of the steel pipe.

19. The method for producing the steel pipe for fuel injection pipe according to claim 9, wherein the outer diameter and the inner diameter of the steel pipe satisfy a following formula (iii):

$$D/d \geq 1.5 \ldots \quad \text{(iii)}$$

where, in the above formula (iii), D denotes the outer diameter (mm) of the steel pipe, and d denotes the inner diameter (mm) of the steel pipe.

20. The method for producing the steel pipe for fuel injection pipe according to claim 16, wherein
the outer diameter and the inner diameter of the steel pipe satisfy a following formula (iii):

$$D/d \geq 1.5 \ldots \quad \text{(iii)}$$

where, in the above formula (iii), D denotes the outer diameter (mm) of the steel pipe, and d denotes the inner diameter (mm) of the steel pipe.

* * * * *

UNITED STATES PATENT AND TRADEMARK OFFICE
CERTIFICATE OF CORRECTION

PATENT NO. : 11,203,793 B2
APPLICATION NO. : 15/736002
DATED : December 21, 2021
INVENTOR(S) : Masuda et al.

It is certified that error appears in the above-identified patent and that said Letters Patent is hereby corrected as shown below:

On the Title Page

Item (56), References Cited, Foreign Patent Documents:
"CN 103789880 5/2014"
Should read:
"CN 103789680 5/2014"

In the Claims

Column 23, Lines 22-44 (Claim 4) should be replaced with:
"4. The steel pipe for the fuel injection pipe according to claim 2, wherein the chemical composition consists of, by mass percent,
C: 0.12 to 0.27%,
Si: 0.05 to 0.50%,
Mn: 0.3 to 2.0%,
Al: 0.005 to 0.060%,
N: 0.0020 to 0.0080%,
Ti: 0.005 to 0.040%,
Nb: 0.015 to 0.045%,
one or more elements selected from:
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%; and
the balance: Fe and impurities, and
contents of Ca, P, S, and O in the impurities being
Ca: 0.001% or less,
P: 0.02% or less, Signed and Sealed this
Ninth Day of August, 2022

*Katherine Kelly Vidal*

Katherine Kelly Vidal
*Director of the United States Patent and Trademark Office*

S: 0.01% or less, and
O: 0.0040% or less."

Column 24, Line 22:
"Ti: 0.0050 to 0.0040%"
Should read:
"Ti: 0.005 to 0.040%:"

Column 24, Line 36:
"8. The steel pipe for fuel injection pipe according to claim"
Should read:
"8. The method for producing the steel pipe for fuel injection pipe according to claim"

Column 24, Line 58:
"9. The steel pipe for the fuel injection pipe according to"
Should read:
"9. The method for producing the steel pipe for fuel injection pipe according to"

Column 25, Line 21:
"diameter (mm) of the steel pip, and d denotes the inner"
Should read:
"diameter (mm) of the steel pipe, and d denotes the inner"

Column 25, Lines 23-32 (Claim 11) should be replaced with:
"11. The steel pipe for the fuel injection pipe according to claim 3, wherein the chemical composition consists of, by mass percent,
C: 0.12 to 0.27%,
Si: 0.05 to 0.50%,
Mn: 0.3 to 2.0%,
Al: 0.005 to 0.060%,
N: 0.0020 to 0.0080%,
Ti: 0.005 to 0.015%,
Nb: 0.015 to 0.045%,
one or more elements selected from:
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%; and
the balance: Fe and impurities, and
contents of Ca, P, S, and O in the impurities being
Ca: 0.001% or less,
P: 0.02% or less,
S: 0.01% or less, and
O: 0.0040% or less."

Column 26, Lines 4 and 5:
"16. The steel pipe for the fuel injection pipe according to
claim 8, wherein the chemical composition contains consists"
Should read:
"16. The method for producing the steel pipe for fuel injection pipe according to
claim 8, wherein the chemical composition consists"